United States Patent
Kim et al.

(10) Patent No.: US 12,417,034 B2
(45) Date of Patent: Sep. 16, 2025

(54) STORAGE DEVICE INCLUDING CONTROLLER AND METHOD OF OPERATING CONTROLLER

(71) Applicant: SK hynix Inc., Gyeonggi-do (KR)

(72) Inventors: Ji Wook Kim, Gyeonggi-do (KR); Won Kyoo Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/365,216

(22) Filed: Aug. 4, 2023

(65) Prior Publication Data
US 2024/0272805 A1    Aug. 15, 2024

(30) Foreign Application Priority Data

Feb. 14, 2023   (KR) .................. 10-2023-0019530

(51) Int. Cl.
*G06F 3/06* (2006.01)

(52) U.S. Cl.
CPC .......... *G06F 3/0619* (2013.01); *G06F 3/0656* (2013.01); *G06F 3/0688* (2013.01)

(58) Field of Classification Search
CPC .... G06F 3/0619; G06F 3/0656; G06F 3/0688; G06F 3/061; G06F 3/0659; G06F 3/0679
See application file for complete search history.

(56) References Cited

U.S. PATENT DOCUMENTS

| | | | |
|---|---|---|---|
| 10,228,869 B1 * | 3/2019 | Nakibly | G06F 3/065 |
| 12,056,072 B1 * | 8/2024 | Kaplan | G06F 3/0611 |
| 2012/0210041 A1 * | 8/2012 | Flynn | H05K 7/1444 |
| | | | 711/3 |
| 2019/0227745 A1 * | 7/2019 | Hong | G06F 3/0616 |
| 2019/0235786 A1 * | 8/2019 | Chun | G06F 3/0604 |

FOREIGN PATENT DOCUMENTS

| | | |
|---|---|---|
| KR | 10-2010-0077051 A | 7/2010 |
| KR | 10-2018-0059342 A | 6/2018 |

* cited by examiner

Primary Examiner — Masud K Khan
(74) Attorney, Agent, or Firm — IP & T GROUP LLP

(57) ABSTRACT

The present technology relates to an electronic device. According to the present technology, a storage device includes a plurality of nonvolatile memory devices, a buffer memory configured to temporarily store data provided by the memory devices, and a controller including a descriptor queue storing a plurality of descriptors, wherein the controller controls the memory devices to perform a read operation corresponding to a first descriptor among the plurality of descriptors, performs a first status check operation of checking whether read data read through the read operation is stored in the buffer memory, and determines, based on a result of the first status check operation, read data to be output to an external device from among the read data read through the read operation.

17 Claims, 12 Drawing Sheets

STORAGE DEVICE INCLUDING CONTROLLER AND METHOD OF OPERATING CONTROLLER

CROSS-REFERENCE TO RELATED APPLICATION

The present application claims priority under 35 U.S.C. § 119 (a) to Korean patent application number 10-2023-0019530 filed on Feb. 14, 2023, the entire disclosure of which is incorporated by reference herein.

BACKGROUND

1. Field of Invention

The present disclosure relates to an electronic device, and more particularly, to a storage device, a controller included in the storage device, and a method of operating the controller.

2. Description of Related Art

A storage device is a device that stores data under control of a host device such as a computer or a smartphone. A storage device may include a memory device storing data and a memory controller controlling the memory device. The memory device may be classified into a volatile memory device and a nonvolatile memory device.

The volatile memory device may be a device that stores data only when power is supplied and loses the stored data when the power supply is cut off. The volatile memory device may include a static random access memory (SRAM), a dynamic random access memory (DRAM), and the like.

The nonvolatile memory device is a device that does not lose data even though power is cut off. The nonvolatile memory device includes a read only memory (ROM), a programmable ROM (PROM), an electrically programmable ROM (EPROM), an electrically erasable and programmable ROM (EEPROM), a flash memory, and the like.

A plurality of memory devices output read data in response to a read command. A time when the plurality of memory devices output the read data may be different for each memory device. Therefore, when the read command is provided to the plurality of memory devices and a next read operation is performed without waiting until all read data provided by the plurality of memory devices are stored in a buffer memory, a read operation may be efficiently performed.

SUMMARY

An electronic device according to an embodiment of the present disclosure provides a controller and a method of operating the same capable of efficiently outputting data to an external device and performing a read operation according to a next descriptor.

According to an embodiment of the present disclosure, a storage device may include a plurality of nonvolatile memory devices, a buffer memory configured to temporarily store data provided by the memory devices, and a controller including a descriptor queue storing a plurality of descriptors, and the controller may control the memory devices to perform a read operation corresponding to a first descriptor among the plurality of descriptors, perform a first status check operation of checking whether read data read through the read operation is stored in the buffer memory, and determine, based on a result of the first status check operation, read data to be output to an external device from among the read data read through the read operation.

According to an embodiment of the present disclosure, a method of operating a controller may include providing a read command according to a specific descriptor among descriptors of a linked list structure, storing read data, which is provided by a memory device in response to the read command, in a buffer memory, performing a status check operation of checking whether the read data is stored in a buffer region allocated to the specific descriptor among regions of the buffer memory, and providing a read command according to a next descriptor of the specific descriptor among the descriptors of the linked list structure. According to an embodiment of the present disclosure, a memory system may include a circular linked list of descriptors; and a control unit configured to: buffer, in response to the individual descriptors remaining within the list, data from one or more memory devices into a buffer, output, from the buffer, at least a part of the buffered data corresponding to a selected one of the descriptors regardless of whether the buffering of all data is completed in response to the selected descriptor, and remove the selected descriptor from the list when the buffering of all data is completed in response to the selected descriptor.

An electronic device according to the present technology may efficiently perform a read operation according to a descriptor.

DETAILED DESCRIPTION

Specific structural or functional descriptions of embodiments according to the concept which are disclosed in the present specification are illustrated only to describe the embodiments according to the concept of the present disclosure. The embodiments according to the concept of the present disclosure may be carried out in various forms and should not be construed as being limited to the embodiments described in the present specification.

Figure 1:
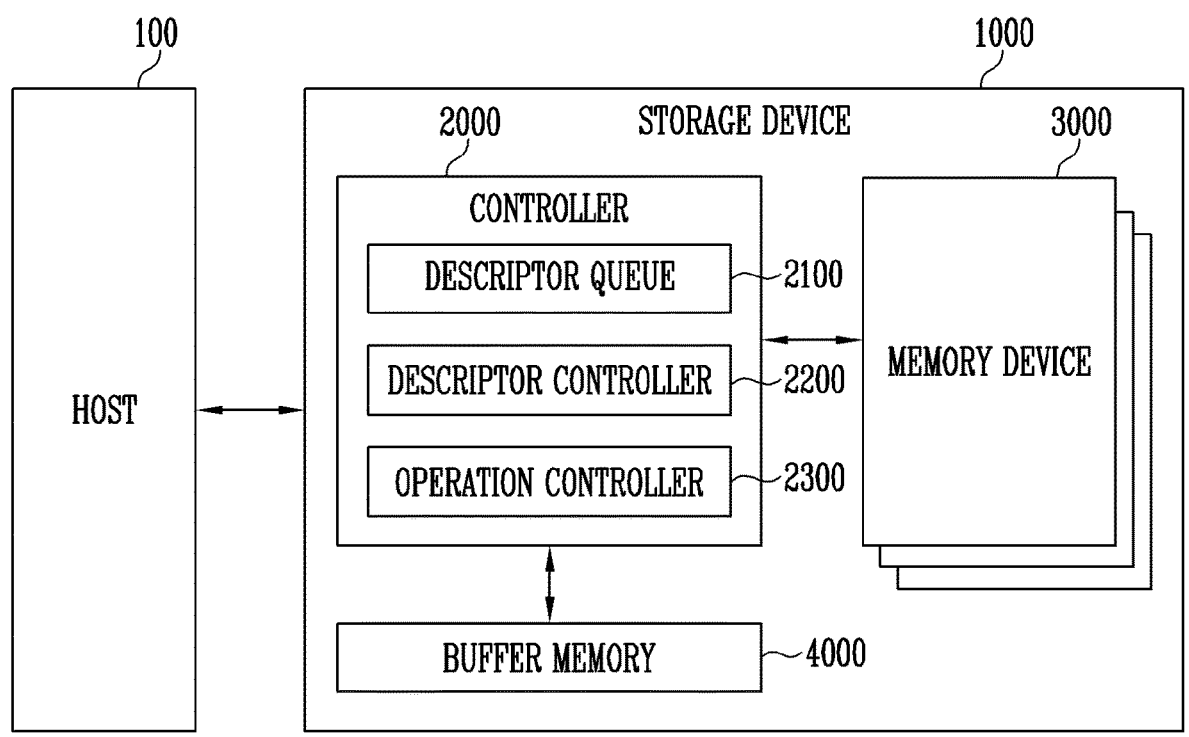
FIG. 1 is a diagram illustrating a storage device according to an embodiment of the present disclosure.

FIG. 1 is a diagram illustrating a storage device 1000 according to an embodiment of the present disclosure.

The storage device 1000 may include a controller 2000, a memory device 3000, and a buffer memory 4000.

The storage device 1000 may be used by being connected to a host 100. The host 100 may include an external device such as a mobile phone, a smart phone, a laptop computer, a desktop computer, a TV, a game console, a tablet PC, an in-vehicle infotainment system, a drone, an autonomous vehicle, and the like. The host 100 may store data in the memory device 3000 by controlling the storage device 1000.

The storage device 1000 may be manufactured as any of various types of storage devices according to a host interface that is a communication method with the host 100. For example, the storage device 1000 may be configured as any of various types of storage devices such as an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-e or PCIe) card type storage device, a compact flash (CF) card, a smart media card, and a memory stick.

The storage device 1000 may be manufactured as any of various types of packages. For example, the storage device 1000 may be manufactured as any of various package types, such as a package on package (POP), a system in package (SIP), a system on chip (SOC), a multi-chip package (MCP), a chip on board (COB), a wafer-level fabricated package (WFP), and a wafer-level stack package (WSP).

The storage device 1000 may include a plurality of memory devices 3000. The memory device 3000 may store data. The memory device 3000 operates in response to control of the controller 2000. The memory device 3000 may include a memory cell array including a plurality of memory cells that store data. The memory cell array may include a plurality of memory blocks. Each of the memory blocks may include a plurality of memory cells. One memory block may include a plurality of pages.

In an embodiment, a page may be a unit for programming data to the memory device 3000 or reading data stored in the memory device 3000. A memory block may be a unit for erasing data stored in the memory device 3000.

In an embodiment, the memory device 3000 may be configured of a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM). In the present specification, for convenience of description, the memory device 3000 is a NAND flash memory.

The buffer memory 4000 may temporarily store data received from the host 100 or data provided by the memory device 3000. In addition, the buffer memory 4000 may temporarily store meta data (for example, a mapping table) of the memory device 3000. The buffer memory 4000 may include a volatile memory such as a DRAM, an SDRAM, a DDR SDRAM, an LPDDR SDRAM, or a GRAM or non-volatile memories such as an FRAM, a ReRAM, an STT-MRAM, and a PRAM. In an embodiment, the buffer memory 4000 may be included in the controller 2000.

The controller 2000 may control overall operations of the storage device 1000.

The controller 2000 may control the memory device 3000 to perform a program operation, a read operation, or an erase operation according to a request of the host 100. When performing the program operation, the controller 2000 may provide a program command and data to the memory device 3000. When performing the read operation, the controller 2000 may provide a read command to the memory device 3000. When performing the erase operation, the controller 2000 may provide an erase command to the memory device 3000.

The memory device 3000 is configured to receive a command and an address from the controller 2000 and access a region selected by the address in the memory cell array. That is, the memory device 3000 may perform an operation corresponding to a command with respect to the region selected by the address. For example, the memory device 3000 may perform the program operation (write operation), the read operation, and the erase operation. During the program operation, the memory device 3000 may program data to the region selected by the address. During the read operation, the memory device 3000 may read data from the region selected by the address. During the erase operation, the memory device 3000 may erase data stored in the region selected by the address.

The controller 2000 may be functionally divided into three layers. Specifically, the controller 2000 may be divided into a host interface layer (HIL) managing an interface with the host 100, a flash interface layer (FIL) managing an interface with the memory device 3000, and a flash translation layer (FTL) managing conversion between two layers.

When power is applied to the storage device 1000, the controller 2000 may execute firmware (FW). In an embodiment, the FW executed by the memory device may be divided into firmware corresponding to each of the HIL, the FTL, and the FIL, and the HIL, the FTL, and the FIL may be used interchangeably as terms referring to the firmware.

The controller 2000 may communicate with the host 100. In an embodiment, the controller 2000 may communicate with the host 100 using at least one of various communication standards or interfaces, such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

The controller 2000 may include a descriptor queue 2100, a descriptor controller 2200, and an operation controller 2300.

The descriptor queue 2100 may store a plurality of descriptors. The descriptor (DSC) may serve as an instruction for operations to be performed in response to a request of the host 100.

Each descriptor may include request information on operations to be performed, address information, and buffer information. The request information may be information indicating an operation to be performed in response to the request from the host 100. The address information may include physical address information at which an operation is to be performed in response to the request from the host 100. The buffer information may include information on a region of the buffer memory 4000 to store data read from the memory device 3000 when a read operation corresponding to each descriptor is performed.

The descriptor controller 2200 may generally control the descriptor queue 2100. The descriptor controller 2200 may update the descriptor queue 2100. The descriptor controller 2200 may perform a specific descriptor among descriptors stored in the descriptor queue 2100 and update the descriptor queue 2100 to perform an operation according to a next descriptor of the performed descriptor.

In an embodiment, the descriptor controller 2200 may control the descriptor queue 2100 to perform a read operation corresponding to the specific descriptor stored in the descriptor queue 2100, and update the descriptor queue 2100 to perform a read operation corresponding to a next descriptor of the specific descriptor.

In an embodiment, when all read data corresponding to the specific descriptor stored in the descriptor queue 2100 are stored in the buffer memory 4000, the descriptor controller 2200 may preferentially provide the read data from the buffer memory 4000 to the host 100, and update the descriptor queue 2100.

The operation controller 2300 may generate a command for performing a descriptor selected from the descriptor queue 2100. The operation controller 2300 may generate the command based on the request information and the address information included in the selected descriptor and provide the command to the memory device 3000.

In an embodiment, the operation controller 2300 may generate a read command CMD_READ for performing the read operation based on the request information included in the selected descriptor. The operation controller 2300 may provide the read command CMD_READ to the memory device 3000 to read data stored in a selected address based on the address information included in the selected descriptor.

The operation controller 2300 may provide the read data provided from the memory device 3000 in response to the read command CMD_READ to the buffer memory 4000. The operation controller 2300 may temporarily store, based on the buffer information included in the selected descriptor, the read data in a region allocated to the selected descriptor within the buffer memory 4000.

Figure 2:
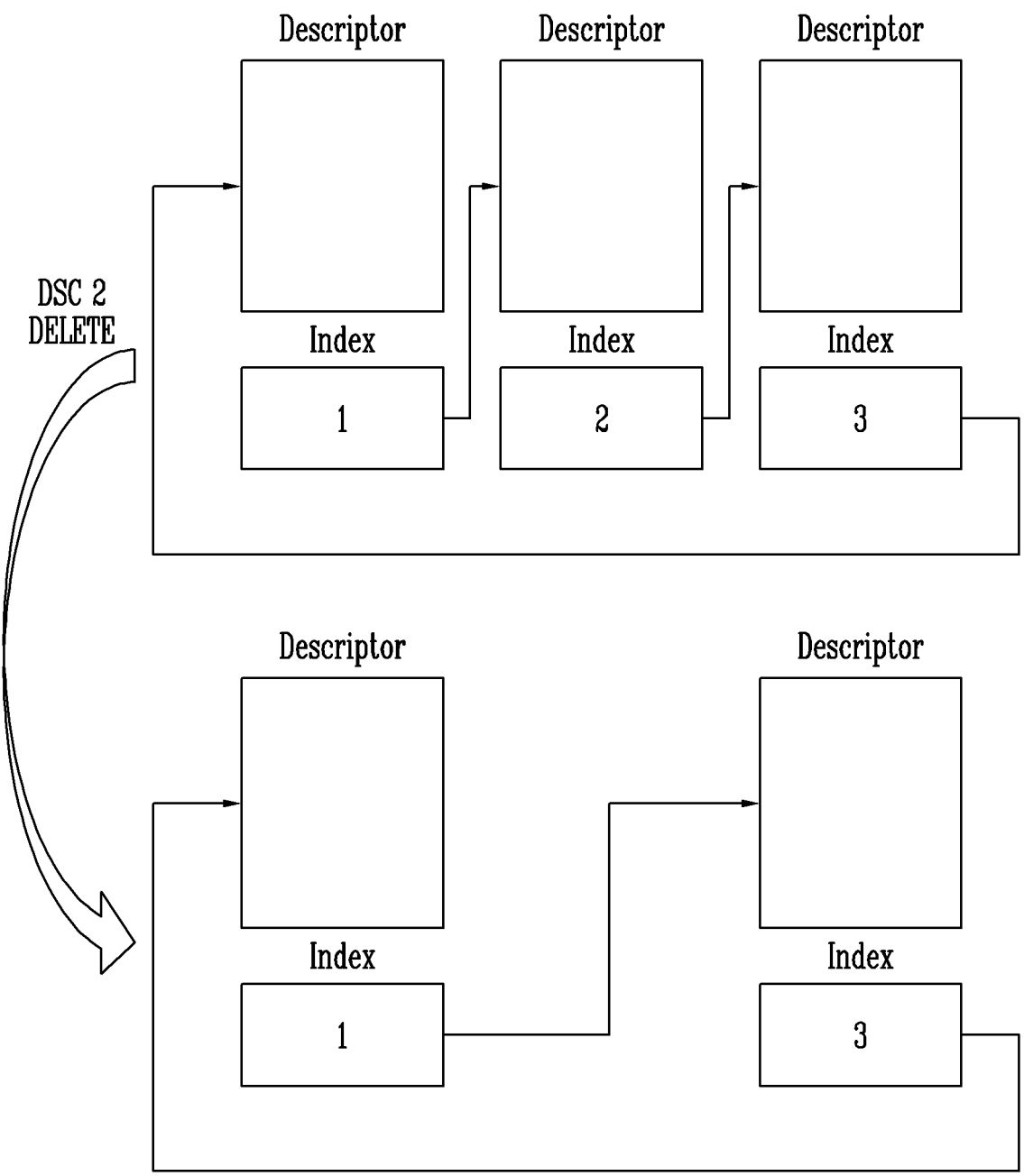
FIG. 2 is a diagram illustrating a descriptor queue according to an embodiment of the present disclosure.

FIG. 2 is a diagram illustrating a descriptor queue 2100 according to an embodiment of the present disclosure.

The descriptor queue 2100 may store a plurality of descriptors. The descriptor queue 2100 may store the plurality of descriptors in a linked list structure. A linked list may be a data structure in which each of component included in a list designate an order for components next thereto. That is, indexes of each descriptor included in the descriptor queue 2100 may indicate a next descriptor.

In an embodiment, when a descriptor corresponding to index 1 is performed, a descriptor to be performed next may be a descriptor indicated by index 1. That is, when performance of the descriptor corresponding to index 1 is completed, the descriptor to be performed next may be a descriptor corresponding to index 2. Similarly, when performance of a descriptor corresponding to index 2 is completed, a descriptor to be performed next may be a descriptor corresponding to index 3.

An index of a descriptor last stored in the descriptor queue 2100 may indicate a descriptor first stored in the descriptor queue 2100. In an embodiment, when the descriptor corresponding to index 3 is performed, a descriptor to be performed next may be the descriptor indicated by index 1.

When performance of a specific descriptor is completed, the specific descriptor of which performance is completed may be removed from the descriptor queue 2100.

In an embodiment, when the performance of the descriptor corresponding to index 2 is completed, the descriptor corresponding to index 2 may be removed from the descriptor queue 2100. The descriptor controller 2200 shown in FIG. 1 may update the descriptor queue 2100 so that index 1, which is an index of a previous descriptor of the descriptor of which performance is completed, indicates the descriptor corresponding to index 3, which is an index of a next descriptor of the descriptor of which performance is completed.

The present disclosure is not limited to such an embodiment. For example, a direction of a descriptor indicated by each of indexes may be opposite to the direction described in the present disclosure.

Figure 3:
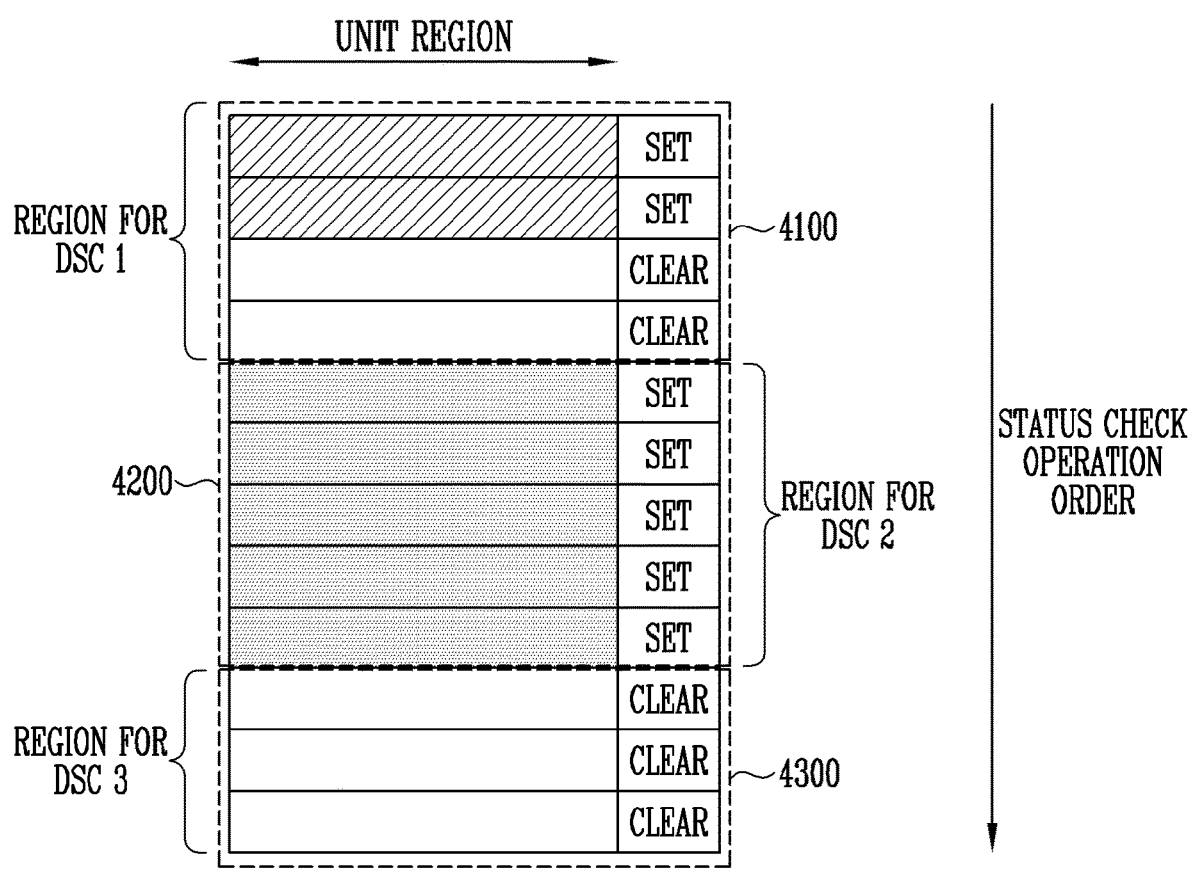
FIG. 3 is a diagram illustrating a buffer memory according to an embodiment of the present disclosure.

FIG. 3 is a diagram illustrating a buffer memory 4000 according to an embodiment of the present disclosure.

The buffer memory 4000 may temporarily store data. The buffer memory 4000 may temporarily store program data provided by the host 100 of FIG. 1. In addition, the buffer memory 4000 may temporarily store read data read from the memory device 3000 of FIG. 1.

Referring to FIG. 3, the buffer memory 4000 may be allocated to each descriptor. A first buffer region 4100 may be a buffer region allocated to a first descriptor. A second buffer region 4200 may be a buffer region allocated to a second descriptor. Similarly, a third buffer region 4300 may be a buffer region allocated to a third descriptor.

The buffer memory 4000 may be configured of a plurality of unit regions. The unit region may be each region in which the buffer memory 4000 is divided for each unit size. In an embodiment, a size of one unit region may correspond to a size of one logical block.

In an embodiment, buffer regions allocated to each descriptor may be allocated based on a size of data to be read according to each descriptor.

In an embodiment, when the size of one unit region is 4 KB and a size of data to be read according to a descriptor is 16 KB, a buffer region corresponding to four unit regions may be allocated to the descriptor.

In an embodiment, when a size of data to be read according to a first descriptor DSC1 is 16 KB, the first buffer region 4100 may include four unit regions. Similarly, when a size of data to be read according to a second descriptor DSC2 is 20 KB, the second buffer region 4200 may include 5 unit regions. Similarly, when a size of data to be read according to a third descriptor DSC3 is 12 KB, the third buffer region 4300 may include three unit regions. However, the unit region does not necessarily have a fixed size, and the present disclosure is not limited to such an embodiment.

Each of the unit regions included in the buffer memory 4000 may include a buffer status register indicating whether data is stored in each of the unit regions. For example, when a status register of an unit region is in a SET (for example, '1' bit) status, the corresponding unit region may be in a status in which data is stored. Conversely, when the status register of an unit region is in a CLEAR (for example, '0' bit) status, the corresponding unit region may be in a status in which data is not stored.

In an embodiment, read data corresponding to a size of two unit regions may be stored in the first buffer region 4100. In this case, the first buffer region 4100 may include two unit regions of the SET status and two unit regions of the CLEAR status.

In an embodiment, read data corresponding to a size of five unit regions may be stored in the second buffer region 4200. In this case, the second buffer region 4200 may include five unit regions of the SET status.

In an embodiment, the read data may not be stored in the third buffer region 4300. In this case, the third buffer region 4300 may include three unit regions of the CLEAR status.

The descriptor controller 2200 shown in FIG. 1 may perform a status check operation of checking whether the read data is stored in the buffer memory 4000. The status check operation may be an operation of checking a status register of the buffer regions 4100, 4200, and 4300 allocated to each descriptor. The status check operation may be performed for each unit region. The status check operation may be performed in an order of the descriptor allocated to the buffer memory 4000. In an embodiment, the descriptor controller 2200 shown in FIG. 1 may perform the status check operation in an order of the first buffer region 4100, the second buffer region 4200, and the third buffer region 4300.

Figure 4:
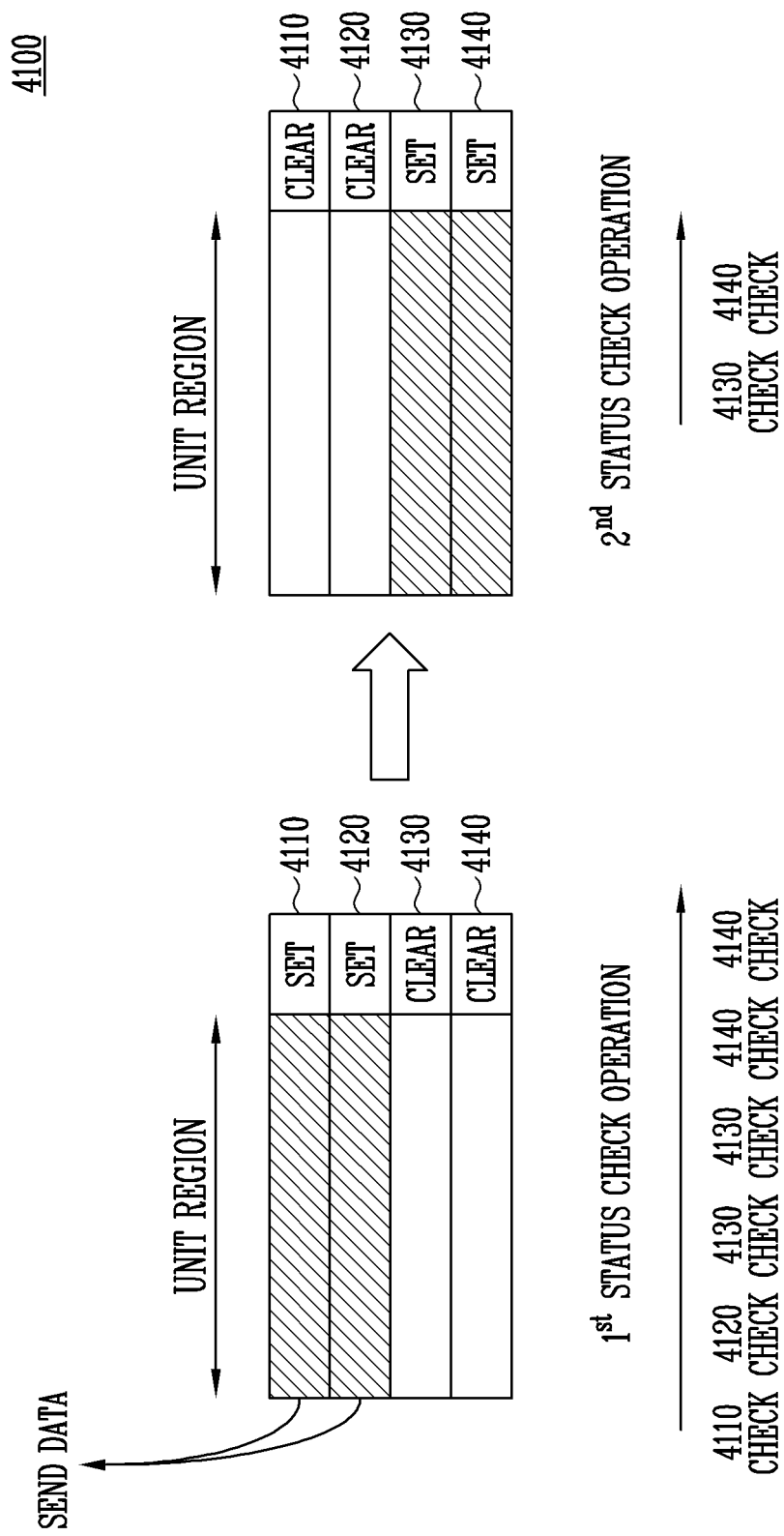
FIG. 4 is a diagram illustrating a status check operation performed according to an embodiment of the present disclosure.

FIG. 4 is a diagram illustrating a status check operation performed according to an embodiment of the present disclosure.

Referring to FIGS. 3 and 4, a status check operation on the first buffer region 4100 is performed.

The operation controller 2300 shown in FIG. 1 may provide a plurality of read commands to the plurality of memory devices 3000 according to the first descriptor. The operation controller 2300 may store the read data provided by the plurality of memory devices 3000 in response to the read commands in the first buffer region 4100.

For convenience of description, the read data is stored in two unit regions included in the first buffer region 4100.

The descriptor controller 2200 shown in FIG. 1 may perform the status check operation on the first buffer region 4100. The descriptor controller 2200 may perform the status checking operation on the first buffer region 4100 for each unit region. When the read data is stored in the unit region on which the status check operation is performed, the status check operation may be passed. Conversely, when the read data is not stored in the unit region on which the status check operation is performed, the status check operation may be failed.

In an embodiment, the descriptor controller 2200 may perform the status check operation in an order of the unit region included in the first buffer region. The descriptor controller 2200 may first perform the status check operation on a unit region 4110. Since the unit region 4110 stores the read data, the unit region 4110 may be in the SET status. The descriptor controller 2200 may check a status register of the unit region 4110, and when the unit region 4110 is in the SET status, the descriptor controller 2200 may perform a status check operation on a next unit region 4120.

In an embodiment, the descriptor controller 2200 may perform the status check operation on the unit region 4120. Since the unit region 4120 stores the read data, the unit region 4120 may be in the SET status. The descriptor controller 2200 may check a status register of the unit region 4120, and when the unit region 4120 is in the SET status, the descriptor controller 2200 may perform a status check operation on a next unit region 4130.

In an embodiment, the descriptor controller 2200 may perform the status check operation on the unit region 4130. Since the unit region 4130 does not store the read data, the unit region 4130 may be in the CLEAR status. The descriptor controller 2200 may check a status register of the unit region 4130, and when the unit region 4130 is in the CLEAR status, the descriptor controller 2200 may determine that the status check operation failed.

The descriptor controller 2200 may perform the status check operation on the unit region until the status check operation fails a preset number of times. For example, the preset number of times may be twice.

In an embodiment, the descriptor controller 2200 may perform the status check operation on the unit region 4130 again. Since the unit region 4130 still does not store the read data, the unit region 4130 may be in the CLEAR status. The descriptor controller 2200 may check the status register of the unit region 4130, and when the unit region 4130 is in the CLEAR status, the descriptor controller 2200 may determine that the status check operation failed.

In an embodiment, since the status check operation on the unit region 4130 failed twice which is the preset number of times, the status check operation on the unit region 4130 may not be performed any more.

In an embodiment, the descriptor controller 2200 may perform a status check operation on a unit region 4140. Since the unit region 4140 does not store the read data, the unit region 4140 may be in the CLEAR status. The descriptor controller 2200 may check the status register of the unit region 4140, and when the unit region 4140 is in the CLEAR status, the descriptor controller 2200 may determine that the status check operation failed.

In an embodiment, the descriptor controller 2200 may perform the status check operation on the unit region 4140 again. Since the unit region 4140 still does not store the read data, the unit region 4140 may be in the CLEAR status. The descriptor controller 2200 may check the status register of the unit region 4140, and when the unit region 4140 is in the CLEAR status, the descriptor controller 2200 may determine that the status check operation failed.

Similarly, since the status check operation on the unit region 4140 failed twice which is the preset number of times, the status check operation on the unit region 4140 may not be performed any more.

The descriptor controller 2200 may complete all status checking operations on the unit regions 4130 and 4140 where the read data is not stored, and output the read data stored in the unit regions 4110 and 4120 of the SET status to the external device.

As described above, even though not all read data are stored in the first buffer region 4100, a read time may be shortened by preferentially outputting the stored read data to the external device through the status check operation.

The descriptor controller 2200 may update the first descriptor DSC1 since all status check operations on the unit regions 4130 and 4140 are failed the preset number of times. In a status check operation on the first descriptor DSC1 to be performed later (see "2nd STATUS CHECK OPERATION" in FIG. 4), the descriptor controller 2200 may update the first descriptor DSC1 to perform the status check operation from the unit regions 4130 and 4140 on which the status check operation failed the preset number of times.

In the status check operation performed later, the descriptor controller 2200 may perform the status check operation on the unit region 4130. Since the unit region 4130 stores the read data, the unit region 4130 may be in the SET status. The descriptor controller 2200 may check the status register of the unit region 4130, and when the unit region 4130 is in the SET status, the descriptor controller 2200 may perform the status check operation on the next unit region 4140.

Similarly, the descriptor controller 2200 may perform the status check operation on the unit region 4140. Since the unit region 4140 stores the read data, the unit region 4140 may be in the SET status. The descriptor controller 2200 may check the status register of the unit region 4140 and check that the unit region 4140 is in the SET status. Since all status check operations on the unit regions 4110, 4120, 4130, and 4140 included in the first buffer region 4100 are passed, the status check operation on the first buffer region 4100 may not be performed any more. The descriptor controller 2200 may output the read data stored in the unit regions 4130 and 4140 to the external device.

Figure 5:
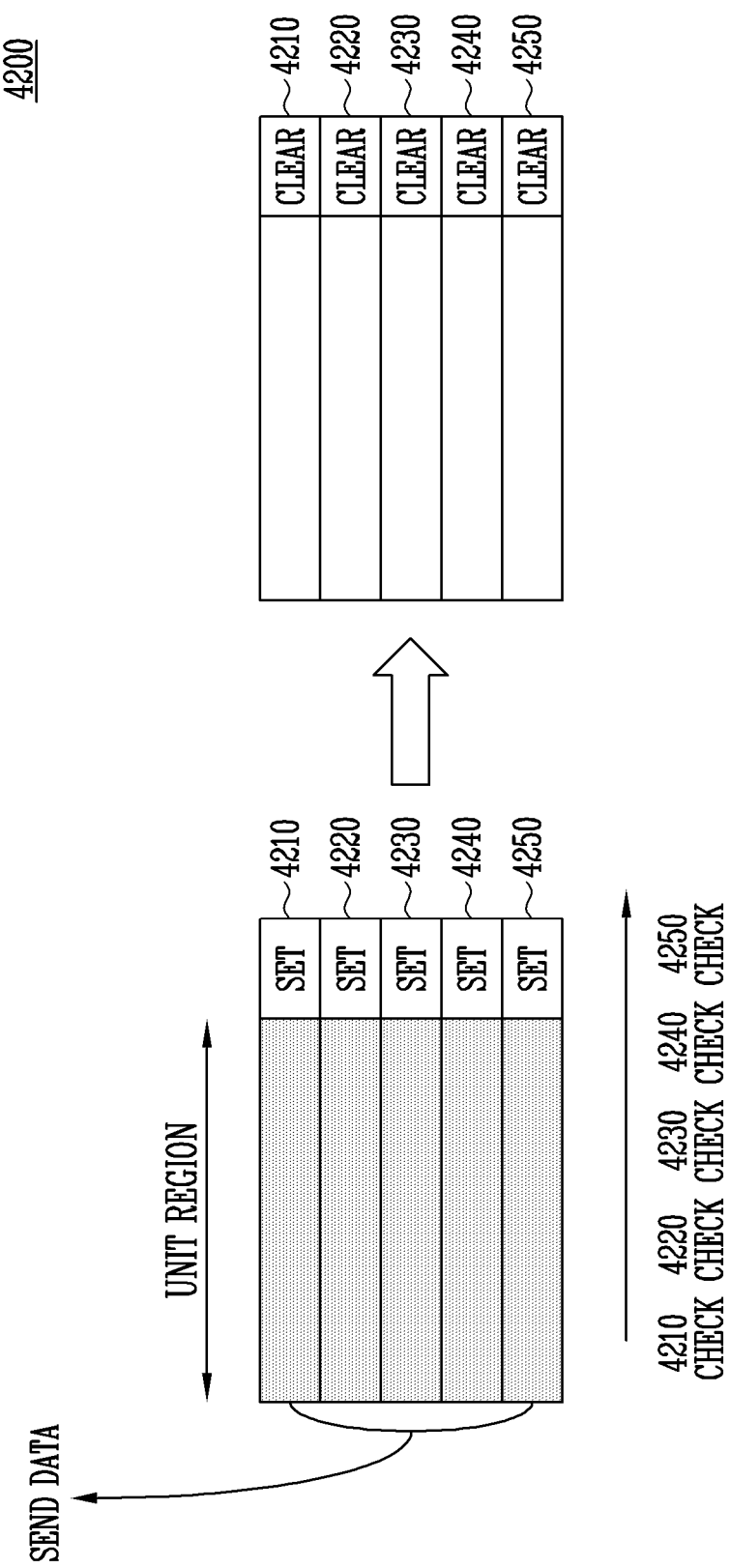
FIG. 5 is a diagram illustrating a status check operation performed according to an embodiment of the present disclosure.

FIG. 5 is a diagram illustrating a status check operation performed according to an embodiment of the present disclosure. As described above in the description of FIG. 4, the operation controller 2300 shown in FIG. 1 may provide a plurality of read commands to the plurality of memory devices 3000 according to the second descriptor. The operation controller 2300 may store the read data provided by the plurality of memory devices 3000 in response to the read commands in the second buffer region 4200.

For convenience of description, all read data are stored in unit regions included in the second buffer region 4200.

The descriptor controller 2200 shown in FIG. 1 may perform the status check operation on the second buffer region 4200.

In an embodiment, the descriptor controller 2200 may perform the status check operation in an order of the unit region included in the second buffer region 4200. The descriptor controller 2200 may first perform the status check operation on a unit region 4210. Since the unit region 4210 stores the read data, the unit region 4210 may be in the SET status. The descriptor controller 2200 may check a status register of the unit region 4210, and when the unit region 4210 is in the SET status, the descriptor controller 2200 may perform a status check operation on a next unit region 420.

In an embodiment, the descriptor controller 2200 may perform the status check operation on the unit region 4220. Since the unit region 4220 stores the read data, the unit region 4220 may be in the SET status. The descriptor controller 2200 may check a status register of the unit region 4220, and when the unit region 4220 is in the SET status, the descriptor controller 2200 may perform a status check operation on a next unit region 4230.

In an embodiment, the descriptor controller 2200 may perform the status check operation on the unit region 4230. Since the unit region 4230 stores the read data, the unit region 4230 may be in the SET status. The descriptor controller 2200 may check a status register of the unit region 4230, and when the unit region 4230 is in the SET status, the descriptor controller 2200 may perform the status check operation on a next unit region 4240.

In an embodiment, the descriptor controller 2200 may perform a status check operation on the unit region 4240. Since the unit region 4240 stores the read data, the unit region 4240 may be in the SET status. The descriptor controller 2200 may check a status register of the unit region 4240, and when the unit region 4240 is in the SET status, the descriptor controller 2200 may perform a status check operation on a next unit region 4250.

Finally, the descriptor controller 2200 may perform the status check operation on the unit region 4250. Since the unit region 4250 stores the read data, the unit region 4250 may be in the SET status. The descriptor controller 2200 may check a status register of the unit region 4250, and when the unit region 4250 is in the SET status, the descriptor controller 2200 may end the status check operation on the second buffer region 4200.

The descriptor controller 2200 may determine that the read operation according to the second descriptor DSC2 is completed when a unit region on which the status check operation is to be performed does not exist in the second buffer region 4200. In this case, the second descriptor DSC2 may be removed from the descriptor queue.

Figure 6:
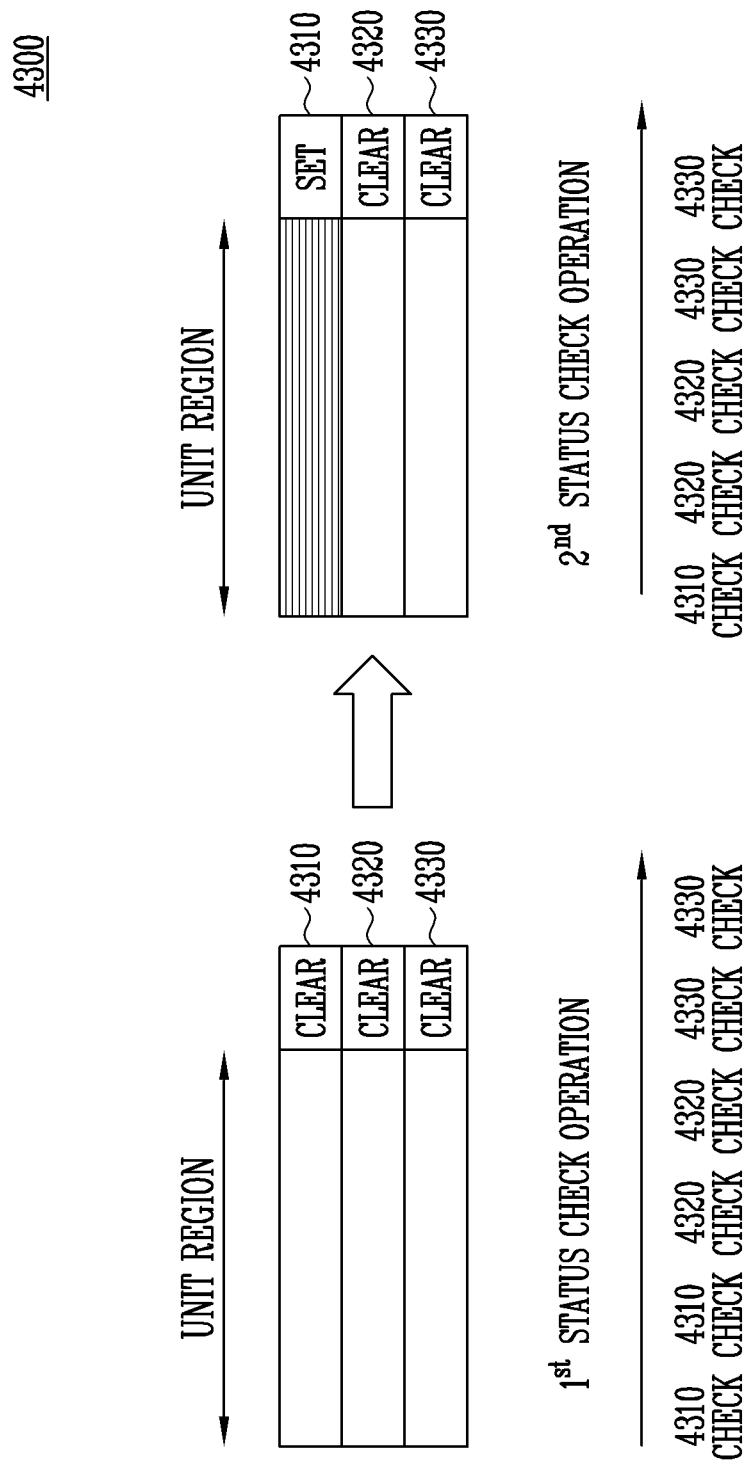
FIG. 6 is a diagram illustrating a status check operation performed according to an embodiment of the present disclosure.
Figure 7:
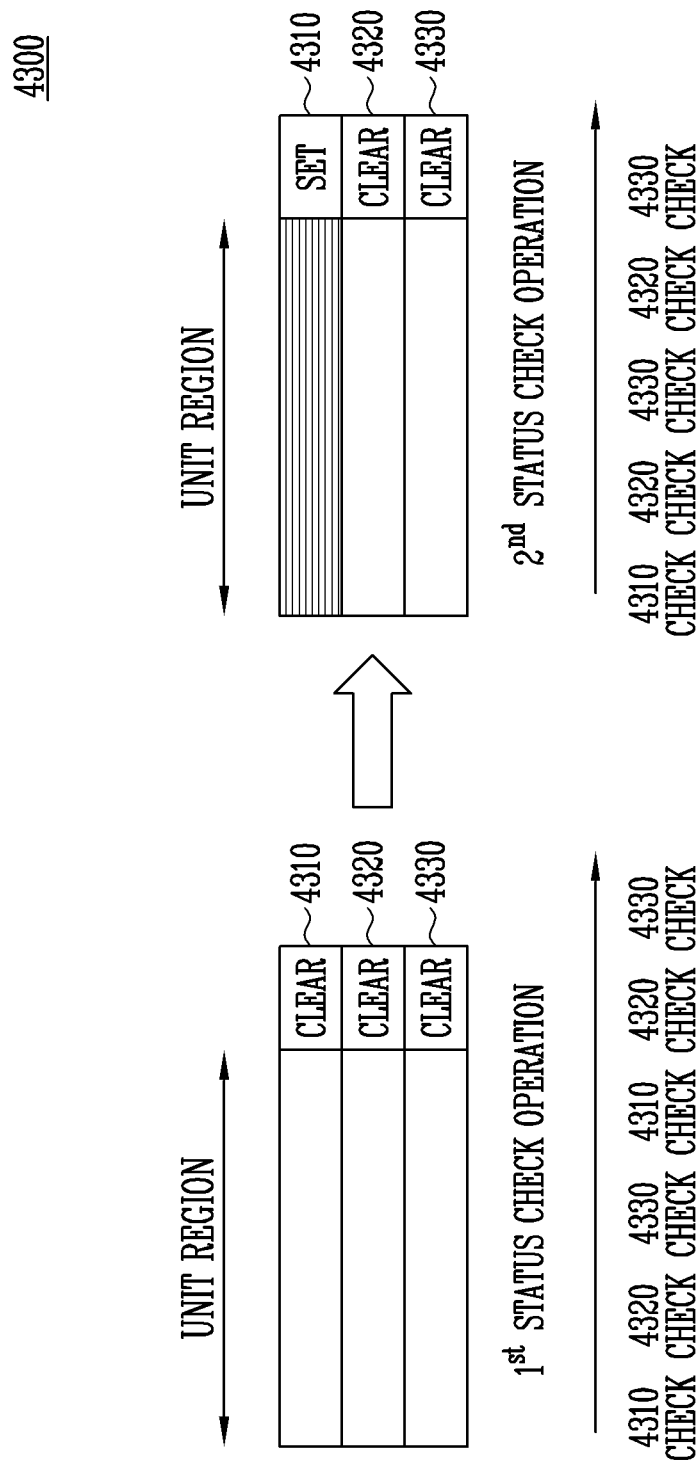
FIG. 7 is a diagram illustrating another order in which a status check operation is performed according to an embodiment of the present disclosure.

FIG. 6 is a diagram illustrating a status check operation performed according to an embodiment of the present disclosure, and FIG. 7 is a diagram illustrating another order in which a status check operation is performed according to an embodiment of the present disclosure.

As described above in the description of FIGS. 4 and 5, the operation controller 2300 shown in FIG. 1 may provide a plurality of read commands to the plurality of memory devices 3000 according to the third descriptor. The operation controller 2300 may store the read data provided by the plurality of memory devices 3000 in response to the read commands in the third buffer region 4300.

The descriptor controller 2200 shown in FIG. 1 may perform the status check operation on the third buffer region 4300. The descriptor controller 2200 may perform the status checking operation on the third buffer region 4300 for each unit region.

The descriptor controller 2200 may perform the status check operation until the status check operation fails a preset number of times. For example, the preset number of times may be twice.

The descriptor controller 2200 may perform a status check operation on a unit region 4310. Since the unit region 4310 does not store the read data, the unit region 4310 may be in the CLEAR status. The descriptor controller 2200 may check a status register of the unit region 4310, and when the unit region 4310 is in the CLEAR status, the descriptor controller 2200 may determine that the status check operation failed.

Referring to FIG. 6, the descriptor controller 2200 may perform the status check operation on the unit region 4310 again (see "1st STATUS CHECK OPERATION" in FIG. 6). Since the unit region 4310 still does not store the read data, the unit region 4310 may be in the CLEAR status. The descriptor controller 2200 may check the status register of the unit region 4310, and when the unit region 4310 is in the CLEAR status, the descriptor controller 2200 may determine that the status check operation failed.

Since the status check operation on the unit region 4310 failed twice, which is the preset number of times, the descriptor controller 2200 may perform a status check operation on a next unit region 4320. The status check operation on the unit region 4310 may not be performed any more in 1st status check operation.

The descriptor controller 2200 may perform the status check operation on the unit region 4320. Since the status check operation on the unit region 4320 failed twice which is the preset number of times, the descriptor controller 2200 may perform a status check operation on a next unit region 4330. The status check operation on the unit region 4320 may not be performed any more in 1st status check operation.

The descriptor controller 2200 may perform the status check operation on the unit region 4330. Since the status check operation on the unit region 4330 failed twice which is the preset number of times, the status check operation on the unit region 4330 may not be performed any more in 1st status check operation.

In 2nd status check operation, the descriptor controller 2200 may perform the status check operation on the unit region 4310. Since the unit region 4310 stores the read data, the unit region 4310 may be in the SET status. The descriptor controller 2200 may check the status register of the unit region 4310, and when the unit region 4310 is in the SET status, the descriptor controller 2200 may perform the status check operation on the next unit region 4320.

Since the status check operation on the unit region 4320 failed twice which is the preset number of times, the descriptor controller 2200 may perform a status check operation on a next unit region 4330. The status check operation on the unit region 4320 may not be performed any more in 2nd status check operation.

Since the status check operation on the unit region 4330 failed twice which is the preset number of times, the status check operation on the unit region 4330 may not be performed any more in 2nd status check operation.

Referring to FIG. 7, In 1st status check operation, when the status check operation on the unit region 4310 fails once, the descriptor controller 2200 may perform a status check operation on a next unit region 4320. When the status check operation on the unit region 4320 fails, the descriptor controller 2200 may perform a status check operation on a next unit region 4330. When the status check operation on the unit region 4330 fails, the descriptor controller 2200 may perform the status check operation on the unit region 4310 where first status check operation failed in 1st status check operation.

In 2nd status check operation, the descriptor controller 2200 may perform the status check operation on the unit region 4310. Since the unit region 4310 stores the read data, the unit region 4310 may be in the SET status. The descriptor controller 2200 may check the status register of the unit region 4310, and when the unit region 4310 is in the SET status, the descriptor controller 2200 may perform the status check operation on the next unit region 4320.

When the status check operation on the unit region 4320 fails, the descriptor controller 2200 may perform a status check operation on a next unit region 4330. When the status check operation on the unit region 4330 fails, the descriptor controller 2200 may perform the status check operation on the unit region 4320 where first status check operation failed in 2nd status check operation.

As shown in FIGS. 6 and 7, when all status check operations for each of unit regions included in the third buffer region 4300 have failed the preset number of times, the status check operation on the third buffer region 4300 may be ended. An order in which the status check operation for each of the unit regions 4310, 4320, and 4330 is performed is not limited to such an embodiment, and the order is sufficient when the status check operation may be performed for each unit region.

Figure 8:
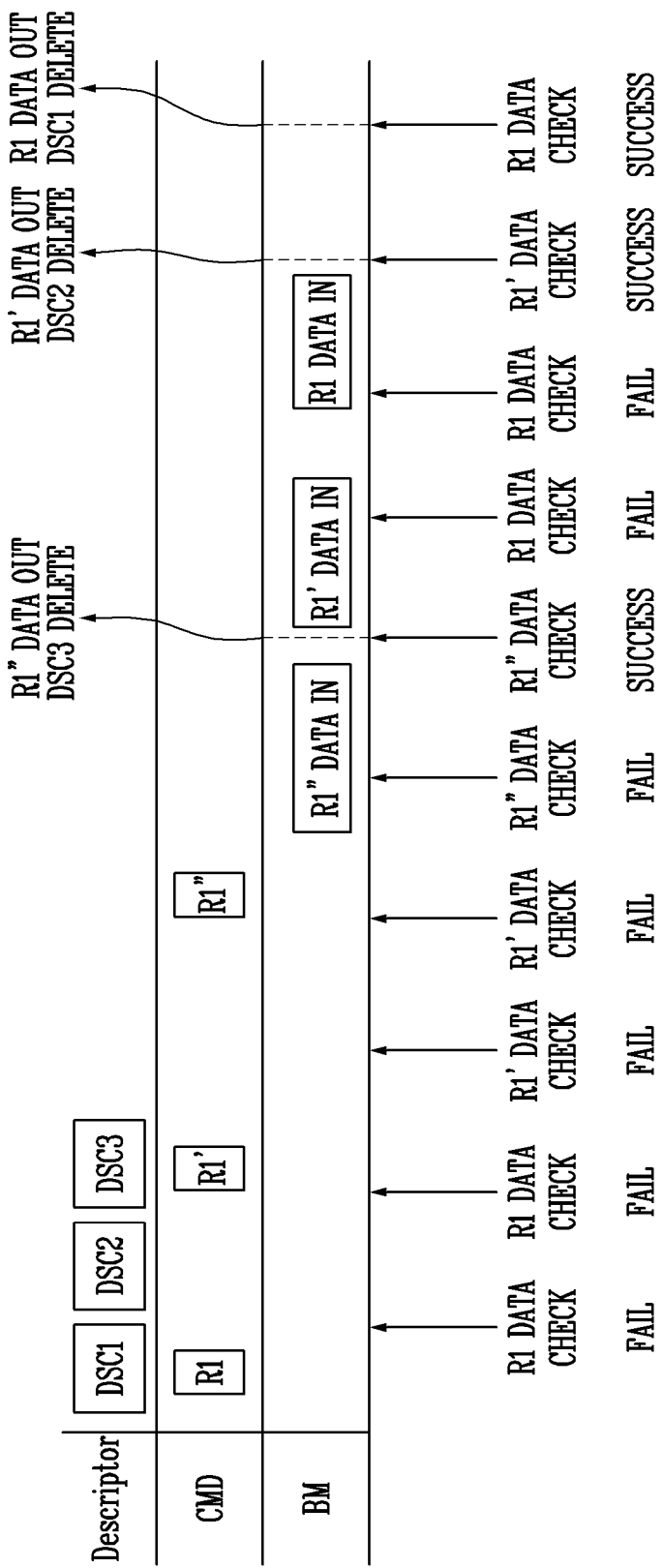
FIG. 8 is a diagram illustrating a process of performing a read operation corresponding to descriptors according to an embodiment of the present disclosure.

FIG. 8 is a diagram illustrating a process of performing a read operation corresponding to descriptors according to an embodiment of the present disclosure.

For convenience of description, the descriptors DSC1, DSC2, and DSC3 include one read command R1, R1', and R1", respectively. In addition, the status check operation is performed up to twice, and each read data has a size of one unit region.

The operation controller 2300 shown in FIG. 1 may provide the read command R1 to a plurality of memory devices based on the first descriptor DSC1. After the read command R1 is provided to the plurality of memory devices, the descriptor controller 2200 shown in FIG. 1 may perform a status check operation of checking whether the read data is stored in a buffer region BM allocated to the first descriptor DSC1. The descriptor controller 2200 may perform the status check operation until the status check operation fails twice, which is the preset number of times.

Since the status check operation on the first descriptor DSC1 failed twice, which is the preset number of times, the descriptor controller 2200 may update the descriptor queue to perform a next descriptor.

The operation controller 2300 may provide the read command R1' according to the second descriptor DSC2 to the plurality of memory devices, based on the updated descriptor queue. After the read command R1' is provided to the plurality of memory devices, the descriptor controller 2200 may perform a status check operation of checking whether the read data is stored in a buffer region BM allocated to the second descriptor DSC2. The descriptor controller 2200 may perform the status check operation until the status check operation fails twice, which is the preset number of times.

Similarly, since the status check operation on the second descriptor DSC2 failed twice, which is the preset number of times, the descriptor controller 2200 may update the descriptor queue to perform a next descriptor.

The operation controller 2300 may provide the read command R1" according to the third descriptor DSC3 to the plurality of memory devices, based on the updated descriptor queue. After the read command R1" is provided to the plurality of memory devices, the descriptor controller 2200 may perform a status check operation of checking whether the read data is stored in a buffer region BM allocated to the third descriptor DSC3. The descriptor controller 2200 may perform the status check operation until the status check operation fails twice, which is the preset number of times.

Referring to FIG. 8, the status check operation first performed on the third descriptor DSC3 failed, and the status check operation secondly performed on the third descriptor DSC3 passed.

Since the status check operation on the third descriptor DSC3 passed, the descriptor controller 2200 may output the read data corresponding to the third descriptor DSC3 to the external device. In addition, since performance of the third descriptor DSC3 is completed, the descriptor controller 2200 may remove the third descriptor DSC3 from the descriptor queue.

The descriptor controller 2200 may update the descriptor queue to perform a next descriptor of the descriptor DSC3 when performance is completed. As described above in the description of FIG. 2, since the descriptor queue has the linked list structure, the next descriptor of the third descriptor DSC3 may be the first descriptor DSC1.

The descriptor controller 2200 may perform the status check operation again based on the updated first descriptor DSC1. That is, the descriptor controller 2200 may perform the status check operation of checking whether the read data is stored in the buffer region BM allocated to the first descriptor DSC1 until the status check operation fails the preset number of times.

Since the status check operation on the first descriptor DSC1 failed twice, which is the preset number of times, the descriptor controller 2200 may update the descriptor queue to perform the next descriptor.

The descriptor controller 2200 may perform the status check operation again based on the updated second descriptor DSC2. That is, the descriptor controller 2200 may perform the status check operation of checking whether the read data is stored in the buffer region BM allocated to the second descriptor DSC2 until the status check operation failed the preset number of times.

The descriptor controller 2200 may output the read data corresponding to the second descriptor DSC2 to the external device since the status check operation on the second descriptor DSC2 passed only once. In addition, since performance of the second descriptor DSC2 is completed, the descriptor controller 2200 may remove the second descriptor DSC2 from the descriptor queue.

The descriptor controller 2200 may update the descriptor queue to perform the next descriptor of the descriptor DSC2 which was performed. As described above in the description of FIG. 2, since the descriptor queue has the linked list structure, the next descriptor of the second descriptor DSC2 may be the first descriptor DSC1.

The descriptor controller 2200 may perform the status check operation again based on the updated first descriptor DSC1. That is, the descriptor controller 2200 may perform the status check operation of checking whether the read data is stored in the buffer region BM allocated to the first descriptor DSC1 until the status check operation failed a preset number of times.

The descriptor controller 2200 may output the read data corresponding to the first descriptor DSC1 to the external device since the status check operation on the first descriptor DSC1 passed only once. In addition, since performance of the first descriptor DSC1 is completed, the descriptor controller 2200 may remove the first descriptor DSC1 from the descriptor queue.

Figure 9:
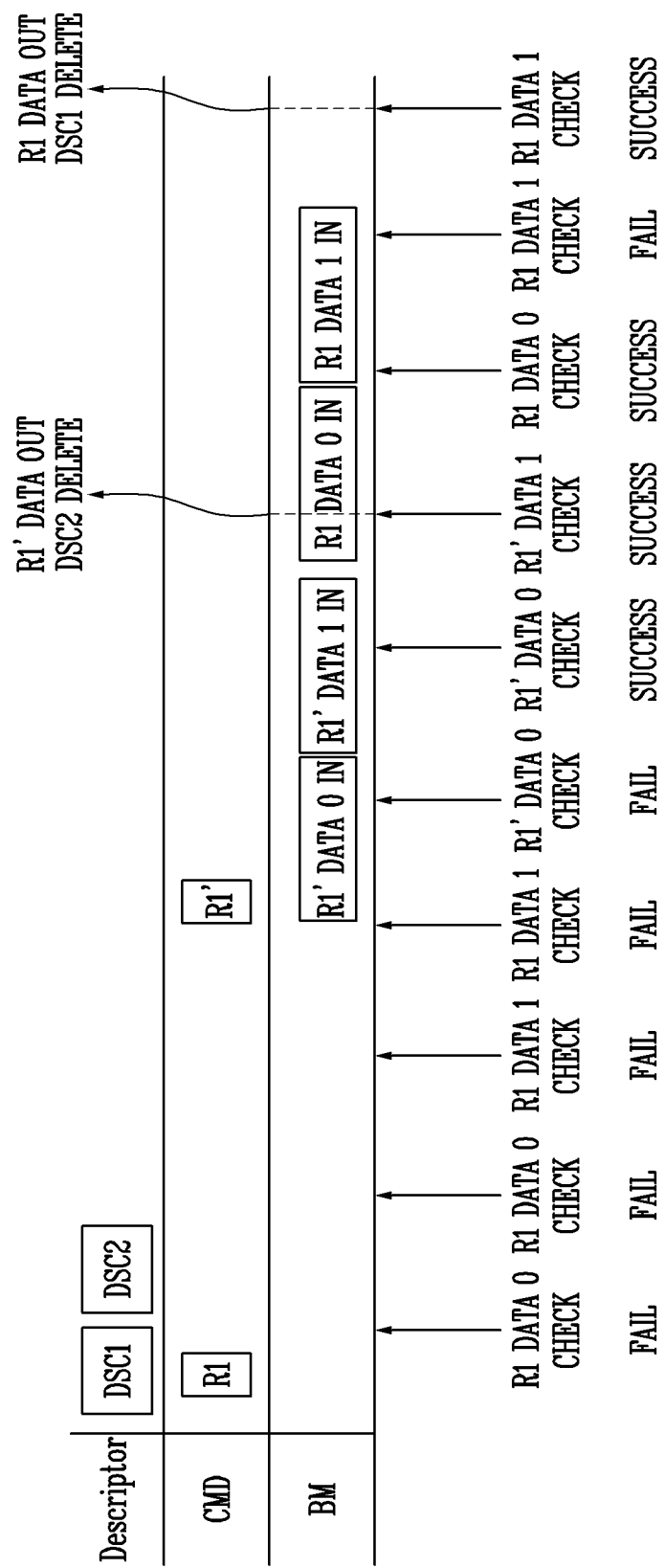
FIG. 9 is a diagram illustrating a process of performing a read operation corresponding to descriptors according to another embodiment of the present disclosure.

FIG. 9 is a diagram illustrating a process of performing a read operation corresponding to descriptors according to another embodiment of the present disclosure.

For convenience of description, the descriptors DSC1 and DSC2 include one read command R1 and R1', respectively. In addition, the status check operation is performed up to twice, and a size of each read data corresponds to two unit regions. The operation controller 2300 shown in FIG. 1 may provide the read command R1 to a plurality of memory devices based on the first descriptor DSC1. After the read command R1 is provided to the plurality of memory devices, the descriptor controller 2200 shown in FIG. 1 may perform a status check operation of checking whether the read data is stored in the buffer region allocated to the first descriptor DSC1, for each unit region. The descriptor controller 2200 may perform the status check operation for unit region until the status check operation fails twice, which is the preset number of times.

The descriptor controller 2200 may check whether read data R1 DATA 0 is stored in a first unit region among buffer regions allocated to the first descriptor DSC1. Since the status check operation on the first unit region failed twice, which is the preset number of times, the descriptor controller 2200 may check whether read data R1 DATA 1 is stored in a second unit region. Since the status check operation on the second unit region failed twice, which is the preset number of times, the descriptor controller 2200 may end the status check operation on the first descriptor.

Since the status check operation on all unit regions allocated to the first descriptor DSC1 failed twice, which is the preset number of times, the descriptor controller 2200 may update the descriptor queue to perform a next descriptor.

The operation controller 2300 may provide the read command R1' according to the second descriptor DSC2 to the plurality of memory devices, based on the updated descriptor queue. After the read command R1' is provided to the plurality of memory devices, the descriptor controller 2200 may perform the status check operation of checking whether the read data is stored in the buffer region allocated to the second descriptor DSC2, for each unit region. The descriptor controller 2200 may perform the status check operation for unit region until the status check operation fails twice, which is the preset number of times.

The descriptor controller 2200 may check whether read data R1' DATA 0 is stored in a first unit region among the buffer regions allocated to the second descriptor DSC2. Since the read data R1' DATA 0 is stored in the first unit region before the status check operation on the first unit region failed twice, which is the preset number of times, the descriptor controller 2200 may determine that the status check operation on the first unit region passed.

The descriptor controller 2200 may check whether read data R1'DATA 1 is stored in a second unit region among the buffer regions allocated to the second descriptor DSC2. Since the read data R1' DATA 1 is stored in the second unit region before the status check operation on the second unit region is performed, the descriptor controller 2200 may determine that the status check operation on the second unit region passed.

The descriptor controller 2200 may output the data R1' DATA 0 and R1' DATA 1 stored in the unit region where status check operation passed, to the external device. In addition, since the descriptor controller 2200 outputs all read data corresponding to the second descriptor to the external device, the descriptor controller 2200 may remove the second descriptor DSC2 from the descriptor queue.

The descriptor controller 2200 may perform the status check operation again based on the updated first descriptor DSC1. That is, the descriptor controller 2200 may perform the status check operation of checking whether the read data is stored in the buffer region allocated to the first descriptor DSC1, for each region. The descriptor controller 2200 may perform the status check operation for each unit region until the status check operation fails twice, which is the preset number of times.

The descriptor controller 2200 may check whether the read data R1 DATA 0 is stored in the first unit region among the buffer regions allocated to the first descriptor DSC1. Since the read data R1 DATA 0 is stored in the first unit region before the status check operation on the first unit region is performed, the descriptor controller 2200 may determine that the status check operation on the first unit region passed.

The descriptor controller 2200 may check whether the read data R1 DATA 1 is stored in the second unit region among the buffer regions allocated to the first descriptor DSC1. Since the read data R1 DATA 1 is stored in the second unit region before the status check operation on the second unit region failed twice, which is the preset number of times, the descriptor controller 2200 may determine that the status check operation on the second unit region passed.

Similarly, the descriptor controller 2200 may output the data R1 DATA 0 and R1 DATA 1 stored in the unit region where the status check operation passed to the external device. In addition, since the descriptor controller 2200 outputs all read data corresponding to the first descriptor to the external device, the descriptor controller 2200 may remove the first descriptor DSC1 from the descriptor queue.

Figure 10:
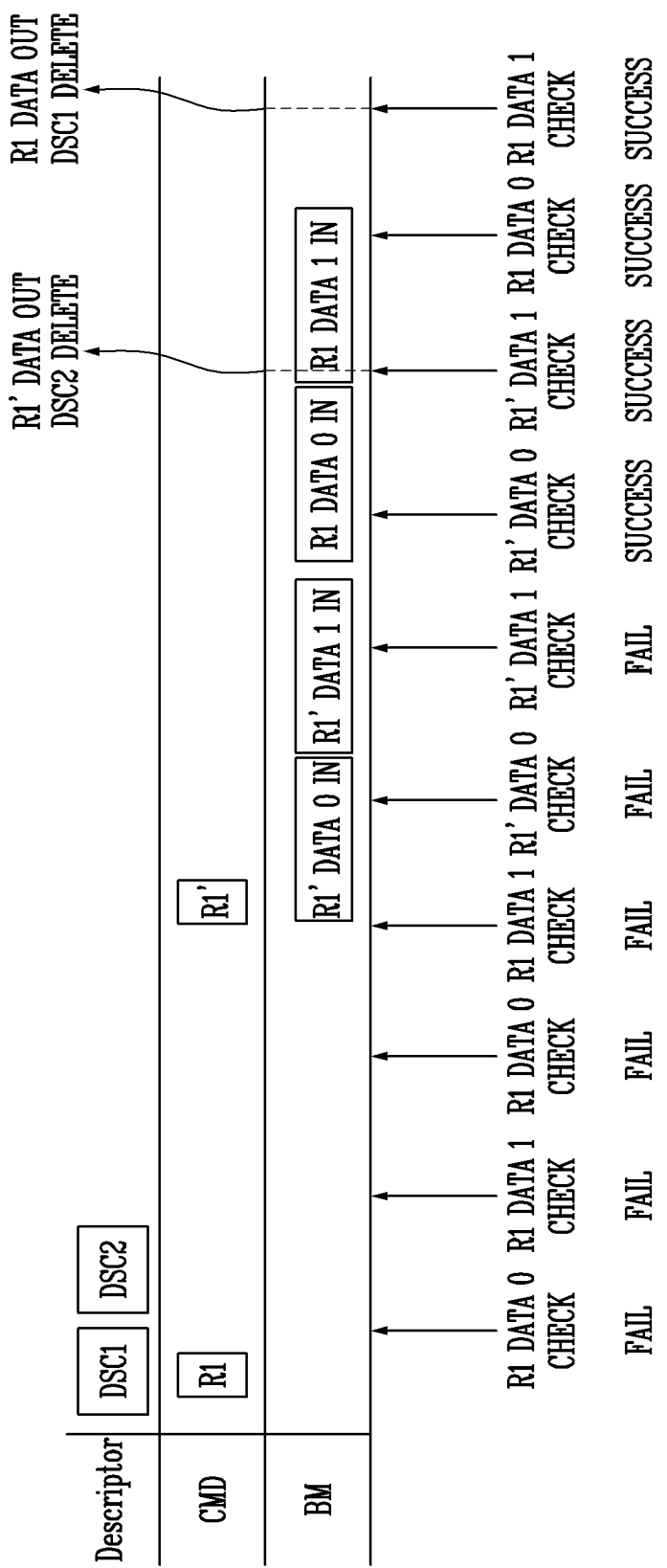
FIG. 10 is a diagram illustrating a process of performing a read operation corresponding to descriptors according to another embodiment of the present disclosure.

FIG. 10 is a diagram illustrating a process of performing a read operation corresponding to descriptors according to another embodiment of the present disclosure.

For convenience of description, the descriptors DSC1 and DSC2 include one read command R1 and R1', respectively.

In addition, the status check operation is performed up to twice, and each read data has a size of two unit regions.

The operation controller 2300 shown in FIG. 1 may provide the read command R1 to a plurality of memory devices based on the first descriptor DSC1. After the read command R1 is provided to the plurality of memory devices, the descriptor controller 2200 shown in FIG. 1 may perform a status check operation of checking whether the read data is stored in the buffer region allocated to the first descriptor DSC1, for each unit region. The descriptor controller 2200 may perform the status check operation for unit region until the status check operation fails twice, which is the preset number of times.

The descriptor controller 2200 may check whether the read data R1 DATA 0 is stored in the first unit region among the buffer regions allocated to the first descriptor DSC1. Since the status check operation on the first unit region failed, the descriptor controller 2200 may check whether the read data R1 DATA 1 is stored in the second unit region.

Since the status check operation on the second unit region failed, the descriptor controller 2200 may check again whether the read data R1 DATA 0 is stored in the first unit region. Since the status check operation on the first unit region failed twice, which is the preset number of times, the descriptor controller 2200 may end the status check operation on the first unit region.

Since the status check operation on the first unit region failed, the descriptor controller 2200 may check again whether the read data R1 DATA 1 is stored in the second unit region. Since the status check operation on the second unit region failed twice, which is the preset number of times, the descriptor controller 2200 may end the status check operation on the second unit region.

Since the status check operation on all unit regions allocated to the first descriptor DSC1 failed twice, which is the preset number of times, the descriptor controller 2200 may update the descriptor queue to perform a next descriptor.

The operation controller 2300 may provide the read command R1' according to the second descriptor DSC2 to the plurality of memory devices, based on the updated descriptor queue. After the read command R1' is provided to the plurality of memory devices, the descriptor controller 2200 may perform the status check operation of checking whether the read data is stored in the buffer region allocated to the second descriptor DSC2, for each unit region. The descriptor controller 2200 may perform the status check operation for unit region until the status check operation fails twice, which is the preset number of times.

The descriptor controller 2200 may check whether the read data R1' DATA 0 is stored in the first unit region among the buffer regions allocated to the second descriptor DSC2. Since the status check operation on the first unit region failed, the descriptor controller 2200 may check whether the read data R1' DATA 1 is stored in the second unit region.

Since the status check operation on the second unit region failed, the descriptor controller 2200 may check again whether the read data R1' DATA 0 is stored in the first unit region. Since the read data R1' DATA 0 is stored in the first unit region before the status check operation on the first unit region is performed again, the descriptor controller 2200 may determine that the status check operation on the first unit region passed.

Since the status check operation on the second unit region has not yet failed twice, the descriptor controller 2200 may check whether the read data R1'DATA 1 is stored in the second unit region. Since the read data R1' DATA 1 is stored in the second unit region before the status check operation on the second unit region is performed again, the descriptor controller 2200 may determine that the status check operation on the second unit region passed.

The descriptor controller 2200 may output the data R1' DATA 0 and R1' DATA 1 stored in the unit region where the status check operation has passed to the external device. In addition, since the descriptor controller 2200 outputs all read data corresponding to the second descriptor DSC2 to the external device, the descriptor controller 2200 may remove the second descriptor DSC2 from the descriptor queue.

The descriptor controller 2200 may perform the status check operation again based on the updated first descriptor DSC1. That is, the descriptor controller 2200 may perform the status check operation of checking whether the read data is stored in the buffer region allocated to the first descriptor DSC1, for each region. The descriptor controller 2200 may perform the status check operation for each unit region until the status check operation fails twice, which is the preset number of times.

Since the read data R1 DATA 0 is stored in the first unit region before the status check operation on the first unit region is performed again, the descriptor controller 2200 may determine that the status check operation on the first unit region passed.

Since the read data R1 DATA 1 is stored in the second unit region before the status check operation on the second unit region is performed again, the descriptor controller 2200 may determine that the status check operation on the second unit region passed.

The descriptor controller 2200 may output the data R1 DATA 0 and R1 DATA 1 stored in the unit region where the status check operation passed to the external device. In addition, since the descriptor controller 2200 outputs all read data corresponding to the first descriptor DSC1 to the external device, the descriptor controller 2200 may remove the first descriptor DSC1 from the descriptor queue.

Figure 11:
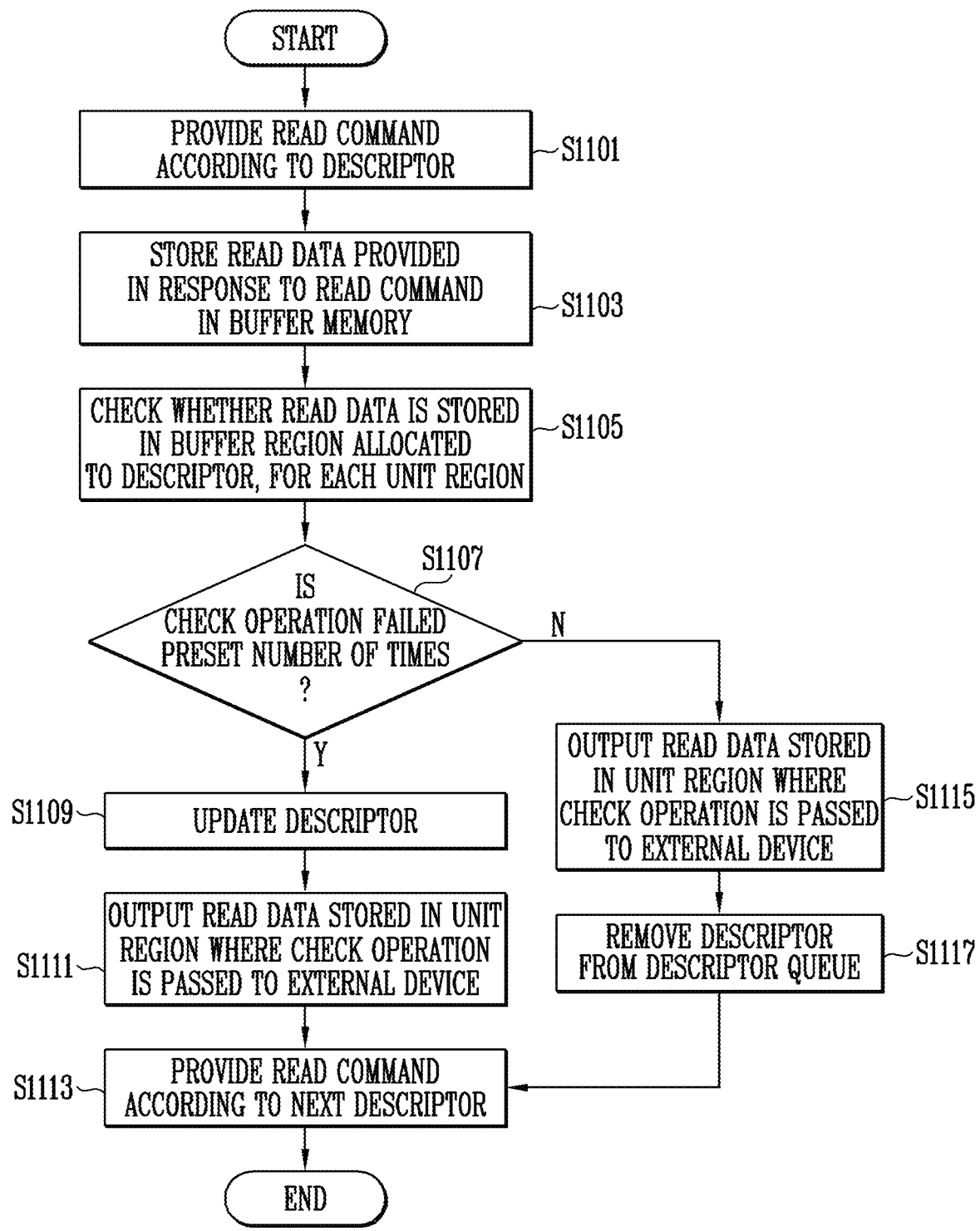
FIG. 11 is a flowchart illustrating an operation of a controller according to an embodiment of the present disclosure.

FIG. 11 is a flowchart illustrating an operation of a controller according to an embodiment of the present disclosure.

In operation S1101, the controller may perform a read operation based on the descriptor. Specifically, the controller may provide the read command to the plurality of memory devices based on the descriptor. The controller may generate the read command based on the request information and the address information included in the descriptor, and provide the read command to read data stored in the selected address region.

In operation S1103, the controller may store the read data, which is provided by the plurality of memory devices in response to the read command, in the buffer memory allocated to the descriptor. In an embodiment, the controller may divide the read data into a size corresponding to a size of the unit region and store the read data. For example, when a size of one unit region is 4 KB and the read data is 16 KB in total, the controller may divide the read data into 4 unit regions and store the read data.

In operation S1105, the controller may perform the status check operation of checking whether the read data is stored in the buffer region allocated to the descriptor. The status check operation may be performed for each unit region. Specifically, when performing the status check operation on the unit region of the SET status, the controller may determine that the status check operation passed. Similarly, when performing the status check operation on the unit region of the CLEAR status, the controller may determine that the status check operation failed. The unit region of the SET status may be in a status in which the read data is stored, and the unit region of the CLEAR status may be in a status in which the read data is not stored.

In operation S1107, the controller may check whether the status check operation failed the preset number of times. Since the status check operation is performed for each unit region, the controller may check whether the status check operation on at least one unit region included in the buffer region allocated to the descriptor has failed the preset number of times.

In operation S1109, the controller may update the descriptor when the status check operation fails the preset number of times. Specifically, in a status check operation to be performed later, the controller may update the descriptor so that the status check operation is performed from the failed unit region.

In operation S1111, the controller may output, to the external device, the read data stored in the unit region where the status check operation passed. A size of the data output to the external device may be a positive integer multiple of the size corresponding to the unit region.

In operation S1113, the controller provide a read command according to the next descriptor. Specifically, the controller may provide the read command to the plurality of memory devices based on the next descriptor. The controller may generate the read command based on the request information and the address information included in the descriptor, and provide the read command to read data stored in the selected address region.

In operation S1115, since the status check operation on all unit regions has not failed, the controller may determine that the status check operation on all unit regions passed. The controller may output, to the external device, the read data stored in the unit region where the check operation passed. Similarly, the size of the data output to the external device may be a positive integer multiple of the size corresponding to the unit region.

In operation S1117, since all read data corresponding to the descriptor is output to the external device, the controller may remove the descriptor from the descriptor queue. Then, the process may proceed to the above-described operation S1113.

Figure 12:
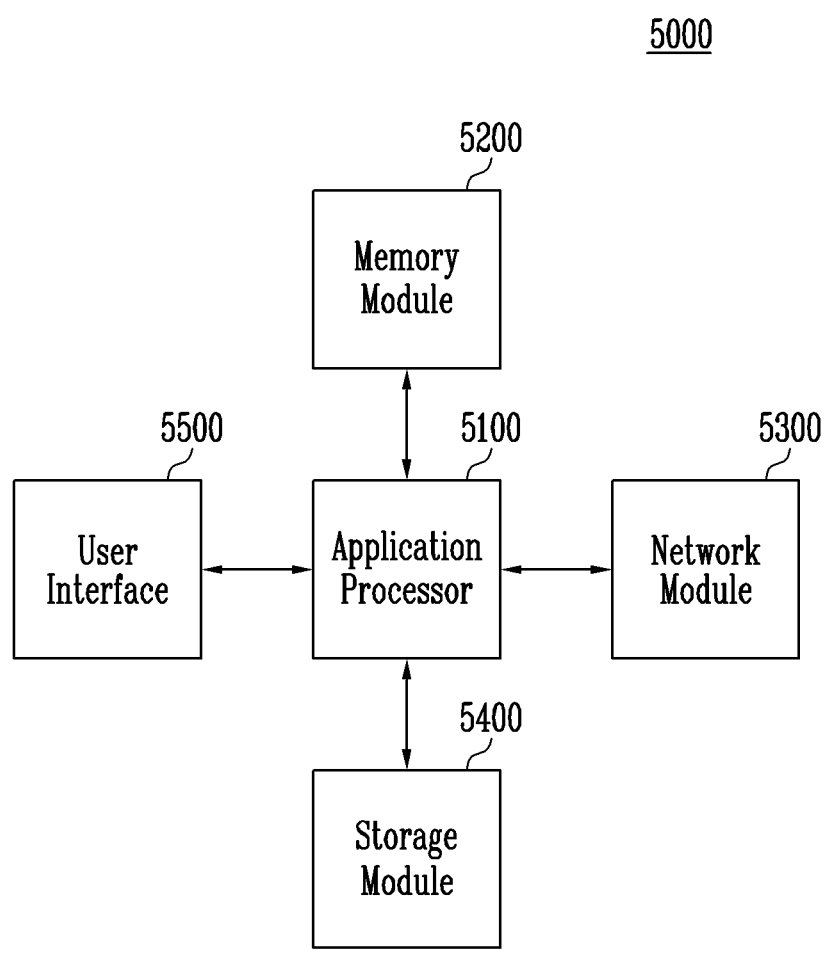
FIG. 12 is a diagram illustrating a user system to which a storage device according to an embodiment of the present disclosure is applied.

FIG. 12 is a diagram illustrating a user system to which a storage device according to an embodiment of the present disclosure is applied.

Referring to FIG. 12, the user system 5000 may include an application processor 5100, a memory module 5200, a network module 5300, a storage module 5400, and a user interface 5500.

The application processor 5100 may drive components, an operating system (OS), a user program, or the like included in the user system 5000. For example, the application processor 5100 may include controllers, interfaces, graphics engines, and the like that control the components included in the user system 5000. The application processor 5100 may be provided as a system-on-chip (SoC).

The memory module 5200 may operate as a main memory, an operation memory, a buffer memory, or a cache memory of the user system 5000. The memory module 5200 may include a volatile random access memory such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a nonvolatile random access memory, such as a PRAM, a ReRAM, an MRAM, and an FRAM. For example, the application processor 5100 and memory module 5200 may be packaged based on a package on package (POP) and provided as one semiconductor package.

The network module 5300 may communicate with external devices. For example, the network module 5300 may support wireless communication such as code division multiple access (CDMA), global system for mobile communications (GSM), wideband CDMA (WCDMA), CDMA-2000, time division multiple access (TDMA), long term evolution, WiMAX, WLAN, UWB, Bluetooth, and WI-FI. For example, the network module 5300 may be included in the application processor 5100.

The storage module 5400 may store data. For example, the storage module 5400 may store data received from the application processor 5100. Alternatively, the storage module 5400 may transmit data stored in the storage module 5400 to the application processor 5100. For example, the storage module 5400 may be implemented as a non-volatile semiconductor memory element such as a phase-change RAM (PRAM), a magnetic RAM (MRAM), a resistive RAM (RRAM), a NAND flash, a NOR flash, and a three-dimensional NAND flash. For example, the storage module 5400 may be provided as a removable storage device (removable drive), such as a memory card, and an external drive of the user system 5000.

For example, the storage module 5400 may include a plurality of non-volatile memory devices, and the plurality of non-volatile memory devices may operate identically to the memory device described with reference to FIG. 1. The storage module 5400 may operate identically to the storage device 1000 described with reference to FIG. 1.

The user interface 5500 may include interfaces for inputting data or an instruction to the application processor 5100 or for outputting data to an external device. For example, the user interface 5500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 5500 may include user output interfaces such as a liquid crystal display (LCD), an organic light emitting diode (OLED) display device, an active matrix OLED (AMOLED) display device, an LED, a speaker, and a monitor.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all operations may be selectively performed or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Various embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein and the following claims. Furthermore, the embodiments may be combined to form additional embodiments.

What is claimed is:

1. A storage device comprising:
a plurality of nonvolatile memory devices;
a buffer memory configured to temporarily store data provided by the memory devices; and
a controller including a descriptor queue storing a plurality of descriptors, and configured to:
control the memory devices to perform a read operation corresponding to a first descriptor among the plurality of descriptors,
perform a first status check operation of checking whether read data read through the read operation is stored in the buffer memory, and
determine, based on a result of the first status check operation, read data to be output to an external device from among the read data read through the read operation,
wherein in response to that the first status check operation fails a preset number of times on a specific unit region among unit regions allocated to the first descriptor, the controller performs the first status check operation on a next unit region of the specific unit region, and
wherein the first status check operation is an operation of checking whether the read data read by the read operation is stored in each of the unit regions allocated to the first descriptor among regions of the buffer memory.

2. The storage device of claim 1, wherein the descriptor queue stores the plurality of descriptors in a linked list structure.

3. The storage device of claim 1, wherein the controller is further configured to output, to the external device, read data stored in a unit region where the first status check operation passed among the unit regions included in the region allocated to the first descriptor.

4. The storage device of claim 3, wherein the controller is further configured to remove the first descriptor from the descriptor queue when the first status check operation passed on all unit regions included in the region allocated to the first descriptor.

5. The storage device of claim 1, wherein when failed unit regions where the first status check operation failed exist among the unit regions, the controller is further configured to perform the first status check operation on the failed unit regions the preset number of times until the first status check operation passes on the failed unit regions.

6. The storage device of claim 5, wherein the controller is further configured to update the descriptor queue so that a read operation corresponding to a second descriptor which is a next descriptor of the first descriptor is performed.

7. The storage device of claim 6, wherein when a second status check operation is performed on the first descriptor after the first status check operation, the controller is further configured to update the first descriptor so that the second status check operation is performed from the unit region where the first status check operation failed.

8. The storage device of claim 6, wherein the controller is further configured to perform a status check operation corresponding to a descriptor stored first in the descriptor queue when a status check operation corresponding to a descriptor stored last in the descriptor queue failed the preset number of times.

9. The storage device of claim 1, wherein a size of the unit region corresponds to a size of one logical block.

10. The storage device of claim 1, wherein each of the plurality of descriptors includes information on a request to be performed, address information, and buffer information.

11. The storage device of claim 1, wherein when the first status check operation on the specific unit region fails once, the controller performs the first status check operation on the next unit region.

12. A method of operating a controller, the method comprising:
providing a read command according to a specific descriptor among descriptors of a linked list structure;
storing read data, which is provided by a memory device in response to the read command, in a buffer memory;
performing a status check operation of checking whether the read data is stored in a buffer region allocated to the specific descriptor among regions of the buffer memory; and
providing a read command according to a next descriptor of the specific descriptor among the descriptors of the linked list structure,
wherein the performing of the status check operation comprises performing, in response to that the status check operation fails a preset number of times on a specific unit region among unit regions included in the buffer region, the status check operation on a next unit region of the specific unit region, and
wherein the status check operation is an operation of checking whether the read data provided by the memory device is stored in each of the unit regions allocated to the specific descriptor among regions of the buffer memory.

13. The method of claim 12, wherein the status check operation is sequentially performed on each of the unit regions according to the preset number of times.

14. The method of claim 12, wherein providing a read command according to the next descriptor comprises outputting the read data stored in the buffer region where the status check operation passed to an external device.

15. The method of claim 12, further comprising updating the specific descriptor so that the status check operation is performed again from a unit region where the status check operation failed among the unit regions.

16. The method of claim 12, further comprising performing the status check operation corresponding to at least one descriptor where the status check operation failed among the descriptors when the specific descriptor is a descriptor where the status check operation performed last among the descriptors.

17. A memory system comprising:
a circular linked list of descriptors; and
a control unit configured to:
buffer, in response to the individual descriptors remaining within the list, data from one or more memory devices into a buffer,
perform a status check operation of checking whether the data is buffered in each of unit regions allocated to a descriptor corresponding to the data, in the buffer,
output, from the buffer, at least a part of the buffered data corresponding to a selected one of the descriptors regardless of whether the buffering of all data is completed in response to the selected descriptor based on a result of the status check operation, and remove the selected descriptor from the list when the buffering of all data is completed in response to the selected descriptor, wherein in response to that the status check operation fails a preset number of times on a specific unit region among unit regions allocated to the selected descriptor, the control unit performs the status check operation on a next unit region of the specific unit region.

* * * * *